Sept. 12, 1933.　　　L. A. SKINNER ET AL　　　1,926,601
LAMBREQUIN FOR COTTON GINS
Filed Nov. 27, 1931
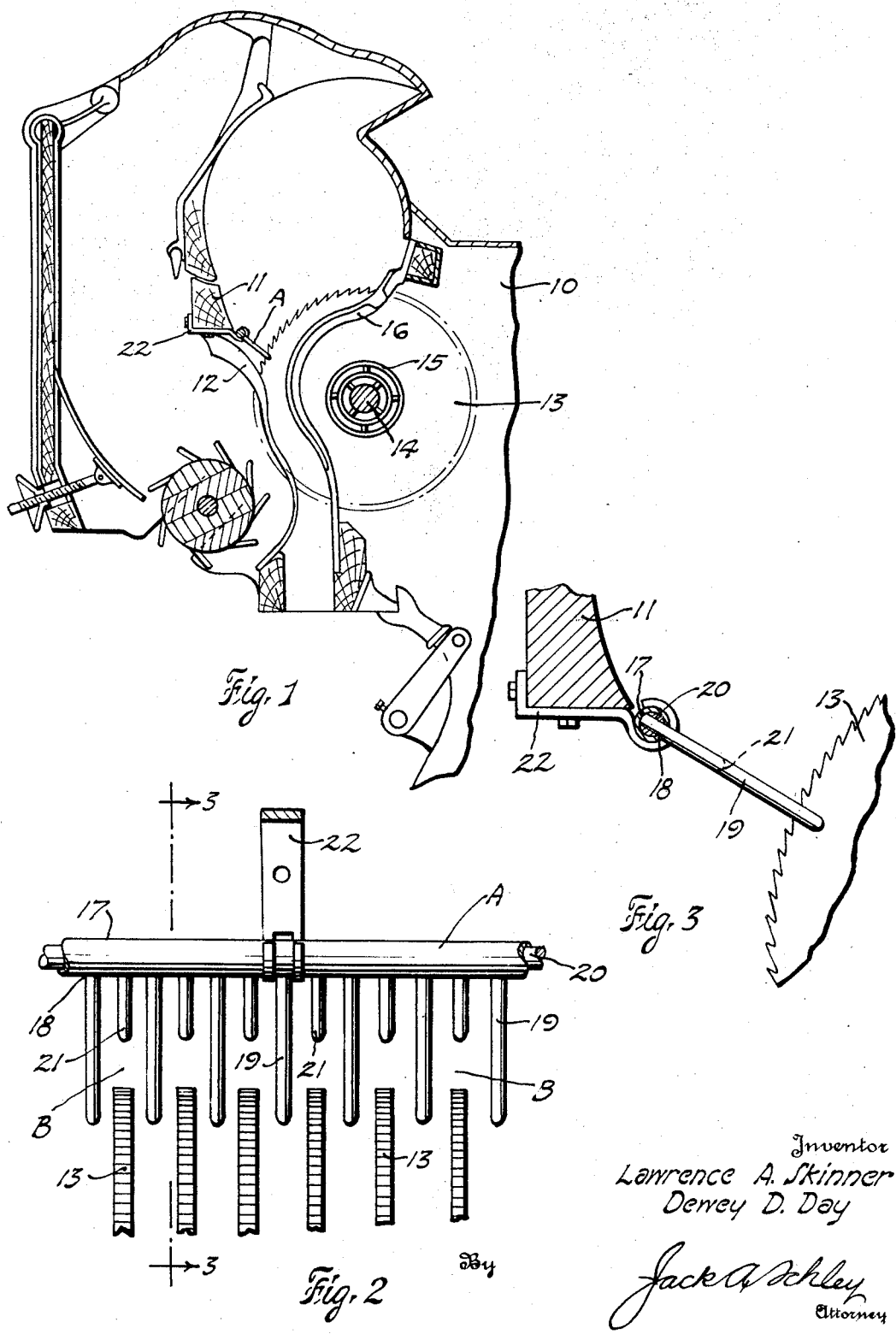
Inventor
Lawrence A. Skinner
Dewey D. Day
By
Jack A. Ashley
Attorney Patented Sept. 12, 1933

1,926,601

UNITED STATES PATENT OFFICE 1,926,601

LAMBREQUIN FOR COTTON GINS

Lawrence A. Skinner and Dewey D. Day, Atlanta, Ga., assignors to The Murray Company, Dallas, Tex., a corporation of Texas Application November 27, 1931
Serial No. 577,494

4 Claims. (Cl. 19—61)

This invention relates to new and useful improvements in lambrequins for cotton gins.

In the ginning of cotton it is customary to employ a toothed or comb-like bar at the bottom of the roll box just over the huller ribs to support the roll of cotton. The lambrequins now in use usually have pins or fingers which extend at right angles to the longitudinal axis of the shaft or rod. These pins are all of the same length and must be spaced far enough apart to allow the seed cotton to be pulled up between them by the saws. With this arrangement the seeds in the roll box have a tendency to fall back through the lambrequin and down between the huller ribs, thus interfering with the operation of the gin.

One object of the invention is to provide a lambrequin so arranged as to prevent the seeds from falling back through the lambrequin into the breast, thus assuring the retention of the seed in the roll box until it has been delinted, and then its discharge into the chute formed between the huller ribs and the gin ribs.

Still another object of the invention is to provide a lambrequin so arranged as to prevent the seeds in the roll box from falling therethrough and interfering with the upward passage of the seeds from the breast.

A further object of the invention is to provide a lambrequin having short fingers arranged between its long fingers for preventing the passage of seeds.

A construction designed to carry out the invention will be hereinafter described together with other features of the invention.

The invention will be more readily understood from a reading of the following specification and by reference to the accompanying drawing in which an example of the invention is shown, and wherein:

Figure 1 is a partial vertical transverse sectional view of a gin equipped with a lambrequin constructed in accordance with the invention, Figure 2 is a partial plan view of the lambrequin showing portions of the adjacent saws, and Figure 3 is a vertical sectional view taken on the line 3—3 of Figure 2.

In the drawing the numeral 10 designates a gin stand of the usual type. A rib rail 11, commonly used in gin stands, is provided for supporting the huller ribs 12.

Gin saws 13 mounted on a saw shaft 14 and held equidistant by spaced blocks 15 project between the huller ribs and act to carry the cotton and seeds up into the roll box.

After the cotton and seeds have passed between the huller ribs 12 they are brought into contact with another set of ribs 16, which are spaced close enough to prevent the seeds from passing therebetween. These ribs are so shaped as to cause the cotton, that is not pulled immediately through them, to roll on top of the saws.

We provide a lambrequin A which includes a pipe or tubing 17 having a rod 20 fastened therein. Holes 18, equally spaced, are drilled in this pipe and rod, and straight fingers 19 are driven therethrough. This is the usual construction. Intermediate the fingers 19 shorter fingers or pins 21 are mounted in the pipe and rod in the same manner. Thus it can be seen that the saws can pull the seed cotton up through the spaces B formed between the fingers 19 and the ends of the pins 21, but the seed is prevented from falling back through the lambrequin by the short pins 21 and the upcoming cotton.

For mounting the lambrequin, angular brackets 22 are bolted to the rib 11, and each has its outer end hooked around the pipe 17. Thus the lambrequin is pivotally mounted and can be adjusted to any desired position in the usual way.

The lambrequin now in general use has been found unsatisfactory mainly because the fingers 19 must be spaced far enough apart to allow the seed to be pulled therebetween by the saws. Thus it can be seen that there is nothing to prevent the seeds from falling from the roll box back in the breast and interfering with the gin operation. By providing the short pins 21 the seeds are held in the roll box and yet sufficient space is provided between the pins 21 and the fingers 19 to permit trash and dirt to fall therebetween.

Where the lambrequin is used without the short pins 21 the seeds will fall between the fingers adjacent the shaft or pipe 17 because of the tendency of the seeds to collect at the front of the roll box and pass down the inner face of the rail 11 to the lambrequin.

By using the short pins between the fingers small seeds are prevented from falling between the fingers adjacent the shaft; also the round pins permit cotton lint to pass upward between the pins and the fingers.

Various changes in the size and shape of the different parts, as well as modifications and alterations, may be made within the scope of the appended claims.

Having illustrated and described a preferred form of the invention, what we claim, is:

1. A lambrequin for cotton gins including a plurality of elongated fingers and having relatively short fingers disposed intermediate the elongated fingers.

2. A lambrequin for cotton gins including a rock shaft having a plurality of long fingers and a plurality of relatively short fingers extending therefrom.

3. The combination with the huller ribs and the gin saws of a cotton gin, of a lambrequin mounted above the huller ribs and having elongated fingers extending between the saws and relatively short fingers disposed intermediate the long fingers and terminating short of the saws.

4. A lambrequin for cotton gins including a rock shaft having a plurality of elongated fingers and having relatively short fingers disposed intermediate the elongated fingers, said fingers being mounted at right angles to the longitudinal axis of the rock shaft.

LAWRENCE A. SKINNER.
DEWEY D. DAY.